US012634554B2

(12) United States Patent
Wang et al.

(10) Patent No.: US 12,634,554 B2
(45) Date of Patent: May 19, 2026

(54) VIDEO PROCESSING METHOD AND APPARATUS, AND DEVICE AND STORAGE MEDIUM

(71) Applicant: Beijing Zitiao Network Technology Co., Ltd., Beijing (CN)

(72) Inventors: Sen Wang, Beijing (CN); Junpeng Xiao, Beijing (CN); Weilin Guan, Beijing (CN); Shuai Han, Beijing (CN); Zhenyu Wang, Beijing (CN); Rongda Sun, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 124 days.

(21) Appl. No.: 18/573,058

(22) PCT Filed: Aug. 5, 2022

(86) PCT No.: PCT/CN2022/110516
§ 371 (c)(1),
(2) Date: Dec. 21, 2023

(87) PCT Pub. No.: WO2023/020303
PCT Pub. Date: Feb. 23, 2023

(65) Prior Publication Data
US 2024/0340492 A1     Oct. 10, 2024

(30) Foreign Application Priority Data

Aug. 18, 2021     (CN) .......................... 202110948294.0

(51) Int. Cl.
| | | |
|---|---|---|
| *H04N 21/442* | (2011.01) | |
| *H04N 21/8352* | (2011.01) | |
| *H04N 21/8355* | (2011.01) | |

(52) U.S. Cl.
CPC . *H04N 21/44204* (2013.01); *H04N 21/44222* (2013.01); *H04N 21/8352* (2013.01); *H04N 21/8355* (2013.01)

(58) Field of Classification Search
CPC ....... H04N 21/44204; H04N 21/44222; H04N 21/8352; H04N 21/8355; H04N 21/258; H04N 21/44218; H04N 21/4532
See application file for complete search history.

(56) References Cited

U.S. PATENT DOCUMENTS

| | | | |
|---|---|---|---|
| 2003/0023968 A1 | 1/2003 | Nishi et al. | |
| 2003/0124973 A1* | 7/2003 | Sie ..................... | H04N 21/2407 455/2.01 |

(Continued)

FOREIGN PATENT DOCUMENTS

| | | |
|---|---|---|
| CN | 1579094 A | 2/2005 |
| CN | 102595196 A | 7/2012 |

(Continued)

OTHER PUBLICATIONS

Office Action for Chinese Patent Application No. 202110948294.0, mailed on Mar. 4, 2025, 14 pages.

(Continued)

*Primary Examiner* — Nathan J Flynn
*Assistant Examiner* — Christine A Kurien
(74) *Attorney, Agent, or Firm* — Astute IP Law Group

(57) ABSTRACT

The present disclosure provides a video processing method and apparatus, a device, and a storage medium. The method includes: firstly, determining whether a type of a target video is a preset video type, where the preset video type is a video type that indicates supporting playing once for each user; determining whether a video state identifier of the target video is a hasViewed identifier if the type of the target video is determined to be the preset video type, where the video (Continued)

state identifier is used for characterizing whether a playing state of the target video, recorded in a server, for a current user is a hasViewed state; and then playing the target video if the video state identifier is determined not to be the hasViewed identifier.

16 Claims, 4 Drawing Sheets

(56) References Cited

U.S. PATENT DOCUMENTS

| | | | | |
|---|---|---|---|---|
| 2006/0136340 A1* | 6/2006 | Park | G06Q 30/04 | 705/52 |
| 2013/0004142 A1* | 1/2013 | Grab | H04N 5/913 | 386/E5.028 |
| 2013/0216207 A1* | 8/2013 | Berry | H04N 5/91 | 386/282 |
| 2016/0149956 A1* | 5/2016 | Birnbaum | H04L 63/101 | 726/1 |

| | | | | |
|---|---|---|---|---|
| 2016/0267943 A1* | 9/2016 | Berry | G11B 27/28 |
| 2017/0064393 A1* | 3/2017 | Carlson | H04N 21/40 |
| 2017/0262139 A1* | 9/2017 | Patel | H04L 51/08 |

FOREIGN PATENT DOCUMENTS

| | | |
|---|---|---|
| CN | 103379451 A | 10/2013 |
| CN | 105120074 A | 12/2015 |
| CN | 106210079 A | 12/2016 |
| CN | 106791934 A | 5/2017 |
| CN | 107801055 A | 3/2018 |
| CN | 111163336 A | 5/2020 |
| JP | 2001251602 A | 9/2001 |
| WO | 2016/081856 A1 | 5/2016 |

OTHER PUBLICATIONS

Office Action for Japanese Patent Application No. 2023-578706, mailed on Jan. 21, 2025, 14 pages.
Extended European Search Report for European Patent Application No. 22857615.3, mailed on Oct. 24, 2024, 10 pages.

* cited by examiner

S101

Determining whether a target video belongs to a preset video type

S102

Determining whether a video state identifier of the target video belongs to a hasViewed identifier if the target video is determined to belong to the preset video type

S103

Playing the target video if the video state identifier is determined not to belong to the hasViewed identifier

400

VIDEO PROCESSING METHOD AND APPARATUS, AND DEVICE AND STORAGE MEDIUM

CROSS-REFERENCE TO RELATED APPLICATION

This is a national stage application based on International Patent Application No. PCT/CN2022/110516, filed Aug. 5, 2022, which claims priority to Chinese Patent Application No. 202110948294.0, filed on Aug. 18, 2021 and titled "video processing method, apparatus, and device, and storage medium", the disclosures of which are incorporated herein by reference in their entireties.

TECHNICAL FIELD

The present disclosure relates to the field of data processing, and in particular, to a video processing method, apparatus, and device, and a storage medium.

BACKGROUND

With the continuous development of the Internet short video technology, people have increasingly diversified requirements on video types, and various video types have been emerged.

At present, a video type that indicates only supporting playing once for each user (except a video maker) and may also be referred to as a flashing video type has attracted attention from people. Specifically, when a user watches a certain flashing video for the first time, a video player can play the video normally; however, when the same user wants to trigger to watch the flashing video again in any scenario, the video player displays that the video cannot be played and prompts the user that the flashing video only can be watched once.

However, because videos in most scenarios at present can be played repeatedly and there is lack of processing experience for the flashing video, a technical problem urgently needing to be solved at present is how to guarantee a playing effect for a flashing video such that each flashing video can only be played once for each user to meet the viewing expectation of the user for the flashing video, thereby enhancing the viewing experience of the user.

SUMMARY

In order to solve or at least partially solve the above technical problems, the present disclosure provides a video processing method, which ensures the playing effect for a flashing video by way of determining whether the target video has been played on a current terminal based on the hasViewed state of the target video recorded in the server for the current user, thereby enhancing the experience of the user watching the video.

In a first aspect, the present disclosure provides a video processing method, and the method comprises:

determining whether a target video belongs to a preset video type, the preset video type being a video type that indicates only supporting playing once for each user;

determining whether a video state identifier of the target video belongs to a hasViewed identifier if the target video is determined to belong to the preset video type, the video state identifier being used for characterizing whether the target video recorded in a server is in a hasViewed state for a current user; and playing the target video if the video state identifier is determined not to belong to the hasViewed identifier.

In an alternative implementation, before the playing the target video, the method further comprises:

inquiring whether the target video belongs to the hasViewed state for the current user in a local history record.

Correspondingly, the playing the target video comprises:

playing the target video if it is determined that, in the local history record, the target video does not belong to the hasViewed state for the current user.

In an alternative implementation, after the playing the target video, the method further comprises:

storing a record that the target video is in the hasViewed state for the current user in the local history record.

In an alternative implementation, the method further comprises:

displaying a preset destroyed state of the target video if it is determined that, in the local history record, the target video belongs to the hasViewed state for the current user.

In an alternative implementation, the local history record comprises video playing history information carrying a video identifier and a user identifier; the inquiring whether the target video belongs to the hasViewed state for the current user in a local history record comprises:

determining whether video playing history information carrying a video identifier of the target video and a user identifier of the current user exists in the local history record.

Correspondingly, the playing the target video if it is determined that, in the local history record, the target video does not belong to the hasViewed state for the current user comprises:

playing the target video if it is determined that the video playing history information carrying the video identifier of the target video and the user identifier of the current user does not exist in the local history record.

In an alternative implementation, the method further comprises:

displaying a preset destroyed state of the target video if the video state identifier is determined to belong to the hasViewed identifier.

In an alternative implementation, after the playing the target video, the method further comprises:

reporting video playing history information carrying a video identifier of the target video and a user identifier of the current user to the server, where the video playing history information is used for updating a playing state of the target video for the current user at the server.

In a second aspect, the present disclosure provides a video processing apparatus, and the apparatus comprises:

a first determination module, configured to determine whether a target video belongs to a preset video type, the preset video type being a video type that indicates only supporting playing once for each user;

a second determination module, configured to determine whether a video state identifier of the target video belongs to a hasViewed identifier if the target video is determined to belong to the preset video type, the video state identifier being used for characterizing whether the target video recorded in a server is in a hasViewed state for a current user; and a playing module, configured to play the target video if the video state identifier is determined not to belong to the hasViewed identifier.

In a third aspect, the present disclosure provides a computer-readable storage medium, the computer-readable storage medium stores instructions, when the instructions are run on a terminal device, the terminal device is caused to implement the above-mentioned method.

In a fourth aspect, the present disclosure provides a device, comprising a memory, a processor, and a computer program stored on the memory and executable on the processor, and the processor is configured to, when executing the computer program, implement the above-mentioned method.

In a fifth aspect, the present disclosure provides a computer program product, the computer program product comprises a computer program/instruction, and when the computer program/instruction is executed by a processor, the above-mentioned method is implemented.

Compared with the prior art, the technical solution provided by the embodiments of the present disclosure has the following advantages:

the embodiments of the present disclosure provides a video processing method, firstly, it is determined whether a target video belongs to a preset video type, and the preset video type is a video type that indicates only supporting playing once for each user; it is determined whether a video state identifier of the target video belongs to a hasViewed identifier if the target video is determined to belong to the preset video type, and the video state identifier is used for characterizing whether the target video recorded in a server is in a hasViewed state for a current user; and then the target video is played if the video state identifier is determined not to belong to the hasViewed identifier. The embodiments of the present disclosure ensure the playing effect for a flashing video by way of determining whether the target video has been played on a current terminal based on the hasViewed state of the target video recorded in the server for the current user, thereby enhancing the experience of the user watching the video.

BRIEF DESCRIPTION OF THE DRAWINGS

The accompanying drawings herein are incorporated into and constitute a part of the specification, show the embodiments consistent with the present disclosure, and together with the specification, serve to explain the principles of the present disclosure.

In order to more clearly illustrate the technical solutions of the embodiments of the present disclosure or the prior art, the drawings required for describing the embodiments or the prior art will be briefly described in the following; it is obvious that those skilled in the art can obtain other drawing (s) according to these drawings, without any inventive work.

DETAILED DESCRIPTION

In order to understand the above objects, features, and advantages of the present disclosure more clearly, the technical solutions of the present disclosure will be further described below. It should be noted that, in case of no conflict, the embodiments of the present disclosure and the features in the embodiments can be combined with each other.

In the following description, many specific details are set forth in order to fully understand the present disclosure, but the present disclosure may be implemented in other ways than those described herein; apparently, the embodiments in the specification are just a part but not all of the embodiments of the present disclosure.

A flashing video type is a video type that indicates only supporting playing once for each user (exclusive of a video maker). At present, most video types support repeatedly playing and there is lack of processing experience for the flashing video, therefore, a technical problem urgently needing to be solved at present is how to guarantee a playing effect for a flashing video such that each flashing video can only be played once for each user to meet the viewing expectation of the user for the flashing video, thereby enhancing the viewing experience of the user.

For this purpose, an embodiment of the present disclosure provide a video processing method, firstly, it is determined whether a target video belongs to a preset video type, and the preset video type is a video type that indicates only supporting playing once for each user; it is determined whether a video state identifier of the target video belongs to a hasViewed identifier if the target video is determined to belong to the preset video type, and the video state identifier is used for characterizing whether the target video recorded in a server is in a hasViewed state for a current user; and then the target video is played if the video state identifier is determined not to belong to the hasViewed identifier. The embodiments of the present disclosure ensure the playing effect for a flashing video by way of determining whether the target video has been played on a current terminal based on the hasViewed state of the target video recorded in the server for the current user, thereby enhancing the experience of the user watching the video.

Figure 1:
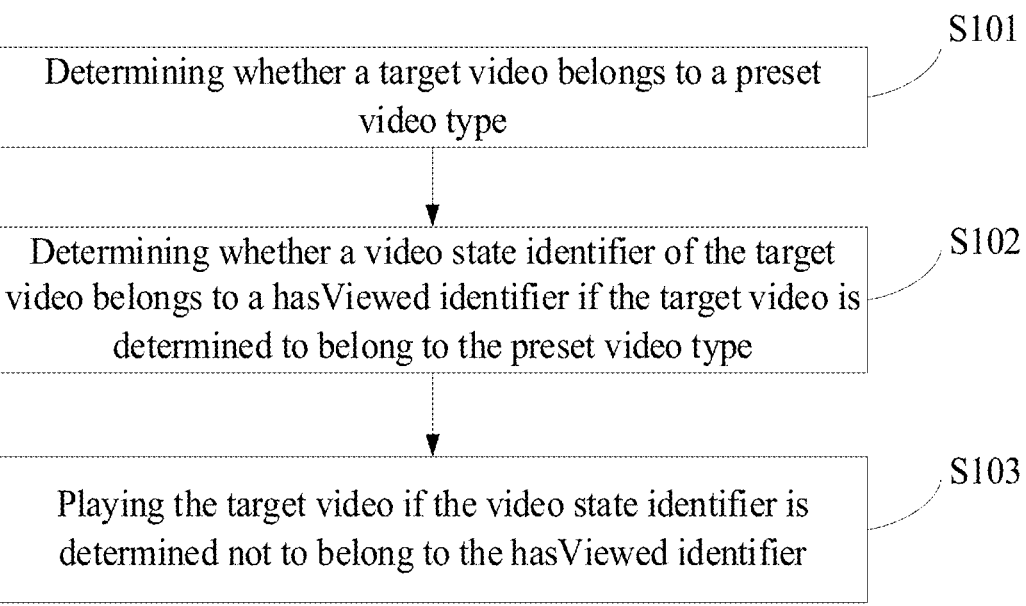
FIG. 1 is a flowchart of a video processing method provided in an embodiment of the present disclosure.

On this basis, an embodiment of the present disclosure provides a video processing method. With reference to FIG. 1, which is a flowchart of a video processing method provided in an embodiment of the present disclosure, the video processing method includes the following steps.

S101: determining whether a target video belongs to a preset video type.

The preset video type is a video type that indicates only supporting playing once for each user.

The video processing method provided in the embodiment of the present disclosure may be applied to a client, and the client includes, for example, a client deployed at a smart phone, a client deployed at a tablet computer, and the like.

In a video playing scenario, before the client plays the target video, firstly, it is determined whether the target video belongs to the preset video type, and the preset video type is a video type that indicates only supporting playing once for each user. For example, the preset video type may be referred to as a flashing video type and may also be referred to as a burn-after-reading video type, and the like.

In practical application, upon receiving a play trigger operation for the target video, the client firstly requests the target video from a server, and the server may also return a video type identifier of the target video to the client while returning the target video to the client, and the video type identifier is used for uniquely identifying the video type to which the target video belongs. The client determines whether the target video belongs to the preset video type based on the video type identifier of the target video, i.e., determines whether the target video belongs to the flashing video type.

For example, assuming that the video type identifier "1" is used for identifying the preset video type, namely the flashing video type, if it is determined that the video type identifier of the target video is "1", it may be determined that the target video belongs to the preset video type; and if it is determined that the video type identifier of the target video is not "1", it may be determined that the target video does not belong to the preset video type.

S102: determining whether a video state identifier of the target video belongs to a hasViewed identifier if the target video is determined to belong to the preset video type.

The video state identifier is used for characterizing whether the target video recorded in a server is in a hasViewed state for a current user.

In an embodiment of the present disclosure, the client is in communication connection with the server. Based on the communication connection between the client and the server, when the target video is played at the client, the client is capable of reporting video playing history information of the target video to the server, and the video playing history information is used for characterizing playing record information of the target video.

The server is capable of determining the video state identifier of the target video based on the video playing history information reported by the client, and sending the video state identifier to the client while sending the target video to the client, and the video state identifier is used for characterizing whether the target video recorded in the server is in the hasViewed state for the current user.

The specific implementation of determining the video state identifier of the target video by the server based on the video playing history information will be introduced in subsequent embodiments, which will not be redundantly described here.

In the embodiment of the present disclosure, because the preset video type indicates only supporting playing once for each user, the client further needs to determine whether the target video is in the hasViewed state for the current user after determining that the target video belongs to the preset video type. Specifically, the client may determine whether the target video is in the hasViewed state for the current user based on the video state identifier of the target video, i.e., determine whether the video state identifier of the target video belongs to the hasViewed identifier.

In an alternative implementation, the video state identifier of the target video may be represented by using a value of a hasViewed field of the target video. If the value of the hasViewed field is true, it indicates that the video state identifier of the target video belongs to the hasViewed identifier; on the contrary, if the value of the hasViewed field is false, it indicates that the video state identifier of the target video does not belong to the hasViewed identifier. Specifically, the client determines whether the target video is in the hasViewed state for the current user based on the video state identifier of the target video, if the value of the hasViewed field of the target video sent by the server is true, it is determined that the record that the target video is in the hasViewed state for the current user is recorded in the server; if the value of the hasViewed field of the target video sent by the server is false, it is determined that the record that the target video is in an unviewed state for the current user is recorded in the server.

S103: playing the target video if the video state identifier is determined not to belong to the hasViewed identifier.

In an embodiment of the present disclosure, if the video state identifier is determined not to be the hasViewed identifier, it indicates that the target video recorded in the server is in the unviewed state for the current user, that is to say, based on the principle of only supporting playing once for each user, the target video can also be played for the current user. Therefore, upon determining that the video state identifier of the target video is not the hasViewed identifier, the target video can be directly played.

For example, if the client determines that the value of the hasViewed field of the target video sent by the server is false, it indicates that the record that the target video is in the unviewed state for the current user is recorded in the server, and at this time, the target video can be played for the current user, which is in conformity with the principle of only supporting playing the target video once for each user.

In an alternative implementation, if the video state identifier is determined to be the hasViewed identifier, a preset destroyed state of the target video is displayed.

In an embodiment of the present disclosure, if the video state identifier of the target video is determined to belong to the hasViewed identifier, it indicates that the record that the target video is in the hasViewed state for the current user is recorded in the server. Based on the principle of only supporting playing once for each user, the client cannot play the target video again for the current user, and in order to prompt the user, the client can display the preset destroyed state of the target video to the current user. The preset destroyed state is used for prompting the current user that the target video is of the video type that indicates only supporting playing once, and the target video has been played by the current user and cannot be played again.

Figure 2:
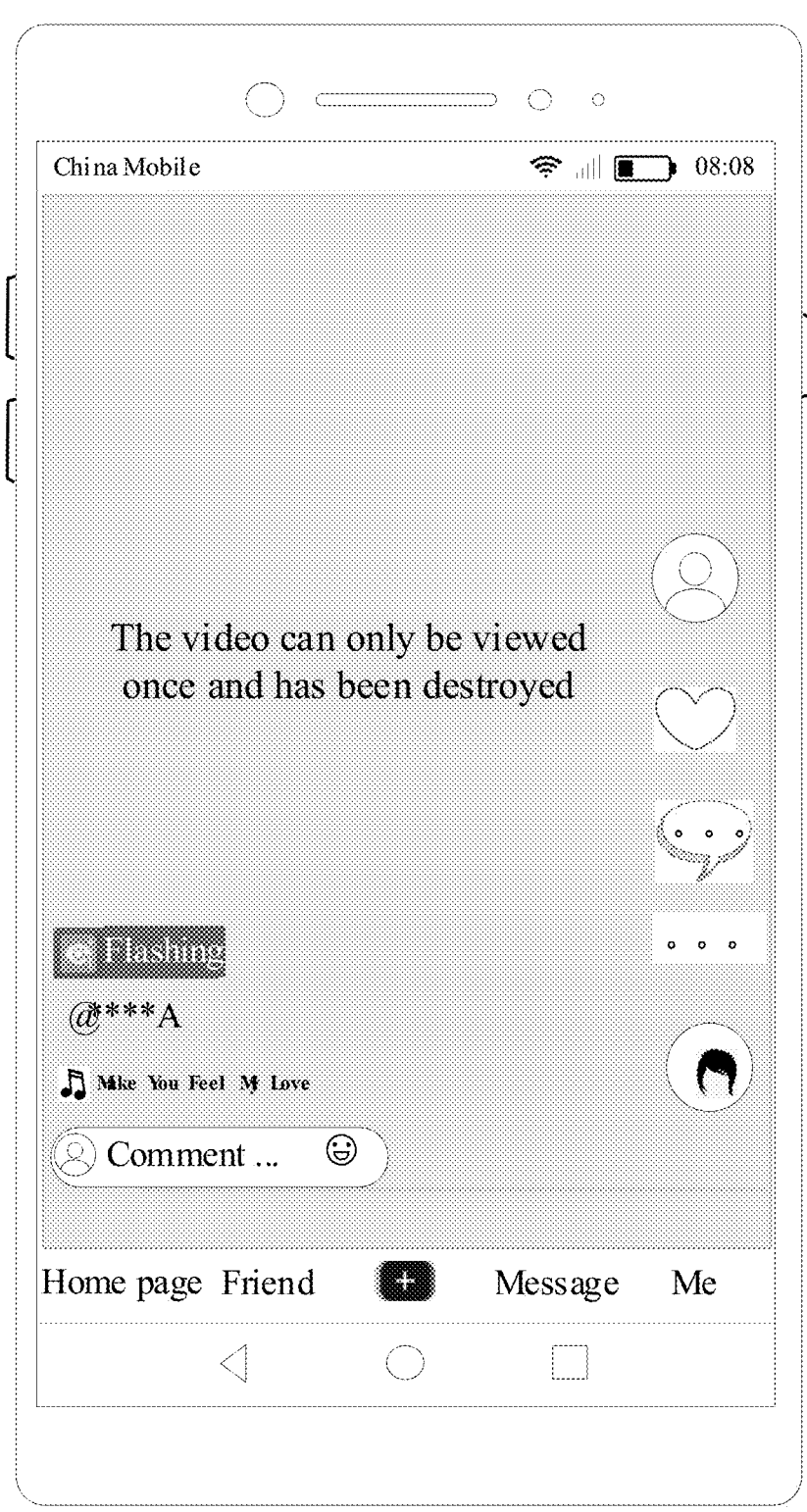
FIG. 2 is a schematic diagram of a target video playing interface provided in an embodiment of the present disclosure.

In an embodiment of the present disclosure, there may be a plurality of methods for displaying the preset destroyed state of the target video. For example, as shown in FIG. 2, which is a schematic diagram of a target video playing interface provided in an embodiment of the present disclosure, a mask layer is displayed on the target video playing interface, and a text prompt, e.g., text such as "the video can only be viewed once and has been destroyed", is displayed on the mask layer.

In the video processing method provided in the embodiments of the present disclosure, firstly, it is determined whether a target video belongs to a preset video type, and the preset video type is a video type that indicates only supporting playing once for each user; it is determined whether a video state identifier of the target video belongs to a hasViewed identifier if the target video is determined to belong to the preset video type, and the video state identifier is used for characterizing whether the target video recorded in a server is in a hasViewed state for a current user; and then the target video is played if the video state identifier is determined not to belong to the hasViewed identifier. The embodiments of the present disclosure ensure the playing effect for a flashing video by way of determining whether the target video has been played on a current terminal based on the hasViewed state of the target video recorded in the server for the current user, thereby enhancing the experience of the user watching the video.

Based on the content in the above embodiments, the video state identifier of the target video is determined based on the video playing history information by the server and is sent to the client by the server. The problem of non-timely updating of the video playing history information may occur between interfaces of different servers. For example, the current user plays the target video of the preset video type in scenario A (e.g., a recommended scenario) and immediately switches to scenario B (e.g., a home page of an author of the target video) to play the target video again, because the interface of the scenario B has not received the information indicating that the target video has been played yet, the video state identifier of the target video determined by the server based on the video playing history information of the interface of the scenario B may be wrong, leading to that the video state identifier sent to the client may not belong to the hasViewed identifier (e.g., hasViewed=false), which in turn results in that the client determines that the target video is in the unviewed state for the current user based on the video state identifier sent by the server. Consequently, the target video of the preset video type is played for several times for the current user, thus affecting the user experience.

Therefore, in order to further guarantee the effect that the target video of the preset video type can be played only once for each user, on the basis of the above embodiments, whether the target video belongs to the hasViewed state for the current user can be determined in combination with the local history record of the client, so as to further ensure the use experience of the user when the user plays the target video of the preset video type.

In an alternative implementation, before playing the target video, whether the target video is in the hasViewed state for the current user is determined by querying in the local history record. If the target video is determined not to be in the hasViewed state for the current user from the local history record, the target video is played.

In an embodiment of the present disclosure, if the video state identifier of the target video is determined not to belong to the hasViewed identifier, it indicates that the server records that the target video is in the unviewed state for the current user. To avoid the problem that the video state identifier is wrong due to non-timely updating of the video playing history information between the interfaces of the servers, the embodiments of the present disclosure may further allow for determining whether the target video is in the hasViewed state for the current user by querying in the local history record of the client. The local history record stores data that can characterize whether the target video is in the hasViewed state for the current user, and the client may perform a query operation on the local history record. For example, a deduplication dictionary may be set at the client to store data indicating whether the target video is in the hasViewed state for the current user, and the client may perform the query operation on the deduplication dictionary.

In an embodiment of the present disclosure, after determining that the video state identifier of the target video is not the hasViewed identifier and determining that the local history record records that the target video is not in the hasViewed state for the current user, the target video may be played for the current user.

In an alternative implementation, if it is determined that, in the local history record, the target video is in the hasViewed state for the current user, the preset destroyed state of the target video is displayed.

In an embodiment of the present disclosure, if the video state identifier of the target video is determined not to belong to the hasViewed identifier and it is determined that, in the local history record, the target video is in the hasViewed state for the current user, it indicates that the video state identifier of the target video determined by the server based on the video playing history information may be wrong due to non-timely updating of the video playing history information between the interfaces of different servers.

Moreover, because the client determines that, in the local history record, the target video is in the hasViewed state for the current user, based on the principle of only supporting playing once for each user, the client cannot play the target video again for the current user. To prompt the user, the preset destroyed state of the target video may be displayed for the current user. For the method of displaying the preset destroyed state of the target video, reference may be made to the method described in S103 of the above embodiment, which will not be redundantly described here.

In an alternative implementation, the local history record includes the video playing history information carrying a video identifier and a user identifier, and the video playing history information is used for recording that the video corresponding to the video identifier is in the hasViewed state for the user corresponding to the user identifier. Firstly, it is determined whether there is the video playing history information carrying the video identifier of the target video and the user identifier of the current user in the local history record, if it is determined that there is no video playing history information carrying the video identifier of the target video and the user identifier of the current user in the local history record, it indicates that the target video corresponding to the video identifier is in the un-played state for the user corresponding to the user identifier, and thus the target video is played. If it is determined that there is the video playing history information carrying the video identifier of the target video and the user identifier of the current user in the local history record, it indicates that the target video corresponding to the video identifier is in the hasViewed state for the user corresponding to the user identifier, and thus the preset destroyed state of the target video is displayed.

For example, whether the target video is in the hasViewed state for the current user is determined by querying in the local history record (e.g., the deduplication dictionary). Specifically, the video identifier (e.g., item ID0) of the target video and the user identifier (e.g., user id0) of the current user may be used as keys, and whether the video playing history information carrying item ID0 and user id0 is stored is looked up in the deduplication dictionary, if it is determined that there is no video playing history information carrying item ID0 and user id0 in the deduplication dictionary, it indicates that the target video has not been played for the current user yet, and thus the target video can be played. If it is determined that there is the video playing history information carrying item ID0 and user id0 in the deduplication dictionary, it indicates that the target video has been played for the current user, and at this time, the target video cannot be played for the current user, and the preset destroyed state of the target video may be displayed for the current user.

In an alternative implementation, after the target video is played, and a record that the target video is in the hasViewed state for the current user is stored in the local history record.

In an embodiment of the present disclosure, if it is determined that there is no video playing history information carrying the video identifier (e.g., item ID0) of the target video and the user identifier (e.g., user id0) of the current user in the local history record (e.g., the deduplication dictionary), the target video is played, and the record that the target video is in the hasViewed state for the current user is stored in the local history record. For example, the video playing history information carrying item ID0 and user id0 is stored in the deduplication dictionary.

If the current user triggers a playing operation on the target video again, the preset destroyed state of the target video may be displayed for the current user based on the video playing history information that the target video (with the video identifier of item ID0) is in the hasViewed state for the current user (with the user identifier of user id0) in the deduplication dictionary.

The embodiments of the present disclosure allow for determining whether the target video is in the hasViewed state for the current user in combination with the local history record of the client and further guarantees the playing effect for the flashing video, thereby better enhancing the experience of the user watching the video.

In an embodiment of the present disclosure, after the target video is played, the video playing history information is not only stored in the local history record of the client but also needs to be reported to the server, and the server stores the video playing history information. The server may determine whether the video state identifier of the target video of the preset video type requested by the client to play is the hasViewed identifier based on the locally stored video playing history information. For example, the server may determine the value of the hasViewed field based on the video playing history information. Specifically, if the server receives the video playing history information reported by the client, it indicates that there is the record information that the target video has been played for the current user in the local history record, and thus the value of the hasViewed field may be set to true. If the value of the hasViewed field is true, it indicates that the video state identifier of the target video is the hasViewed identifier. If the server does not receive the video playing history information reported by the client, it indicates that there is no record information that the target video has been played for the current user in the local history record, and thus the value of the hasViewed field may be set to false. If the value of the hasViewed field is false, it indicates that the video state identifier of the target video is not the hasViewed identifier.

In an alternative implementation, after the target video is played, the client reports the video playing history information carrying the video identifier of the target video and the user identifier of the current user to the server.

The video playing history information is used for updating the playing state of the target video for the current user at the server.

In an embodiment of the present disclosure, after the target video is played, the client reports the video playing history information carrying the video identifier (e.g., item ID0) of the target video and the user identifier (e.g., user id0) of the current user to the server, and the server updates the playing state of the target video for the current user based on the video playing history information, so that the server can send the updated video state identifier to the client when the current user triggers the playing operation on the target video again. For example, the video state identifier of the target video may be updated as the hasViewed identifier (e.g., the value of hasViewed is updated to true), so that the server can send the video state identifier with the value of the hasViewed field being true to the client when the current user triggers the playing operation on the target video again. Furthermore, the client may determine that the target video has been played for the current user based on the updated video state identifier and thus displays the preset destroyed state of the target video for the current user.

In an embodiment of the present disclosure, when the client reports the video playing history information corresponding to the target video to the server, a dual-link reporting manner may be used so as to guarantee the security of reporting the video playing history information.

In addition, an embodiment of the present disclosure may also report the video playing history information corresponding to the video of the preset video type by using one dedicated link, thereby avoiding delay in reporting and reporting the video playing history information to the server in time. Thus, the accuracy of determining the video state identifier of the target video subsequently by the server based on the video playing history information is guaranteed.

Figure 3:
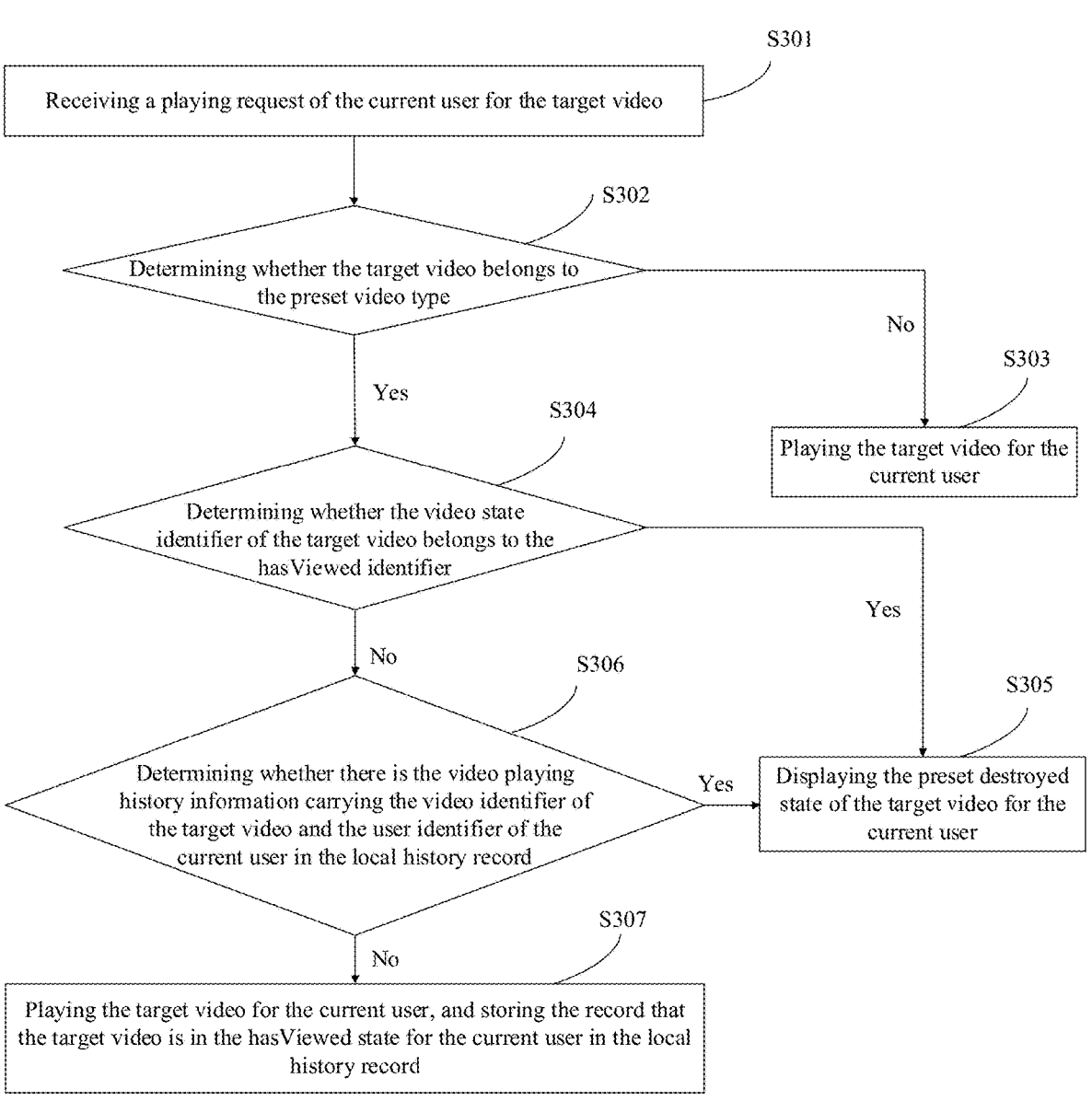
FIG. 3 is a flowchart of another video processing method provided in an embodiment of the present disclosure.

Based on the above embodiments, the present disclosure provides a specific application scenario of a video processing method. As shown in FIG. 3, which is a flowchart of another video processing method provided in an embodiment of the present disclosure, taking a case that the preset video type is the flashing video type and the video state identifier is represented by using the value of the hasViewed field of the target video as an example, the video processing method includes the following steps.

S301: receiving a playing request of the current user for the target video.

In an embodiment of the present disclosure, when the current user triggers the playing operation on the target video, the client receives the playing request for the target video and requests the target video from the server.

S302: determining whether the target video belongs to the preset video type; if no, S303 is performed; and if yes, S304 is performed.

The preset video type is a video type that indicates only supporting playing once for each user.

In an embodiment of the present disclosure, the server may also return the video type identifier of the target video to the client while returning the target video to the client, and the video type identifier is used for uniquely identifying the video type to which the target video belongs. Taking a case that the preset video type is the flashing video type as an example, assuming that the video type identifier "1" is used for identifying the flashing video type, if the video type identifier of the target video is determined to be "1", it may be determined that the type of the target video is the flashing video type, and then S304 is performed. If the video type identifier of the target video is determined not to be "1", it may be determined that the type of the target video is not the flashing video type, and then S303 is performed.

S303: playing the target video for the current user.

In an embodiment of the present disclosure, based on the above S302, if the target video is determined not to belong to the flashing video type, the target video may be directly played for the current user.

S304: determining whether the video state identifier of the target video belongs to the hasViewed identifier; if yes, S305 is performed; and if no, S306 is performed.

The video state identifier is used for characterizing whether the target video recorded in the server is in the hasViewed state for the current user.

In an embodiment of the present disclosure, the video state identifier of the target video is determined by the server based on the video playing history information reported by the client, and the video state identifier is sent to the client while the target video is sent to the client, and the video playing history information is used for characterizing the playing record information of the target video.

Taking a case that the video state identifier is represented by using the value of the hasViewed field of the target video as an example, if the value of the hasViewed field is true, it indicates that the video state identifier of the target video is the hasViewed identifier, and it is determined that the server records that the target video is in the hasViewed state for the current user, and thus S305 is performed. If the value of the hasViewed field is false, it indicates that the video state identifier of the target video is not the hasViewed identifier, and it is determined that the server records that the target video is in the unviewed state for the current user, and thus S306 is performed.

S305: displaying the preset destroyed state of the target video for the current user.

In an embodiment of the present disclosure, based on the above S304, if it is determined that the target video is in the hasViewed state for the current user, based on the principle of only supporting playing once for each user, the client cannot play the target video again for the current user. To prompt the user, the preset destroyed state of the target video may be displayed to the current user. With reference to FIG. 2, the mask layer is displayed on the target video playing interface, and the text prompt "the video can only be viewed once and has been destroyed" is displayed on the mask layer.

S306: determining whether there is the video playing history information carrying the video identifier of the target video and the user identifier of the current user in the local history record; if yes, S305 is performed; and if no, S307 is performed.

In an embodiment of the present disclosure, the local history record includes the video playing history information carrying the video identifier (e.g., item ID0) and the user identifier (e.g., user id0), and the video playing history information is used for recording that the video corresponding to the video identifier is in the hasViewed state for the user corresponding to the user identifier.

Whether there is the video playing history information carrying the video identifier of the target video and the user identifier of the current user in the local history record (e.g., the deduplication dictionary) is determined; if no, it indicates that the video corresponding to the video identifier (item ID0) is in the unviewed state for the user corresponding to the user identifier (user id0), and thus S307 is performed. If yes, it indicates that the video corresponding to the video identifier (item ID0) is in the hasViewed state for the user corresponding to the user identifier (user id0), and thus S305 is performed to display the preset destroyed state of the target video. The specific preset destroyed state may be the same as that exemplified in S305, which will not be redundantly described here.

In an embodiment of the present disclosure, based on the above S304, if the video state identifier of the target video is determined not to belong to the hasViewed identifier and it is determined that, in the local history record, the target video is in the hasViewed state for the current user, it indicates that the video state identifier of the target video determined by the server based on the video playing history information may be wrong due to non-timely updating of the video playing history information between the interfaces of different servers.

S307: playing the target video for the current user, and storing the record that the target video is in the hasViewed state for the current user in the local history record.

In an embodiment of the present disclosure, based on the above S306, if it is determined that there is no video playing history information carrying the video identifier (e.g., item ID0) of the target video and the user identifier (e.g., user id0) of the current user in the local history record (e.g., the deduplication dictionary), the target video may be played. Moreover, the video playing history information carrying the video identifier of the target video and the user identifier of the current user is stored in the local history record of the client. For example, the video playing history information carrying item ID0 and user id0 is stored in the deduplication dictionary.

If the current user triggers the playing operation on the target video again, the preset destroyed state of the target video may be displayed to the current user based on the video playing history information that the target video (with the video identifier of item ID0) is in the hasViewed state for the current user (with the user identifier of user id0) in the deduplication dictionary.

In the video processing method provided in the embodiments of the present disclosure, whether the target video belongs to the preset video type is determined, if no, the target video is played for the current user, and if yes, whether the video state identifier of the target video is the hasViewed identifier is determined continuously; if yes, the preset destroyed state of the target video is displayed to the current user, and if no, whether there is the video playing history information carrying the video identifier of the target video and the user identifier of the current user in the local history record is determined continuously; if yes, the preset destroyed state of the target video is displayed to the current user, and if no, the target video is played for the current user, and the record that the target video is in the hasViewed state for the current user is stored in the local history record.

Thus it can be seen that the embodiments of the present disclosure allows for determining whether the target video is in the hasViewed state for the current user in combination with the local history record of the client, effectively avoids the problem that the video state identifier is wrong due to non-timely updating of the video playing history information between interfaces of the servers, and further guarantees the playing effect for the flashing video, thereby better enhancing the experience of the user watching the video.

Figure 4:
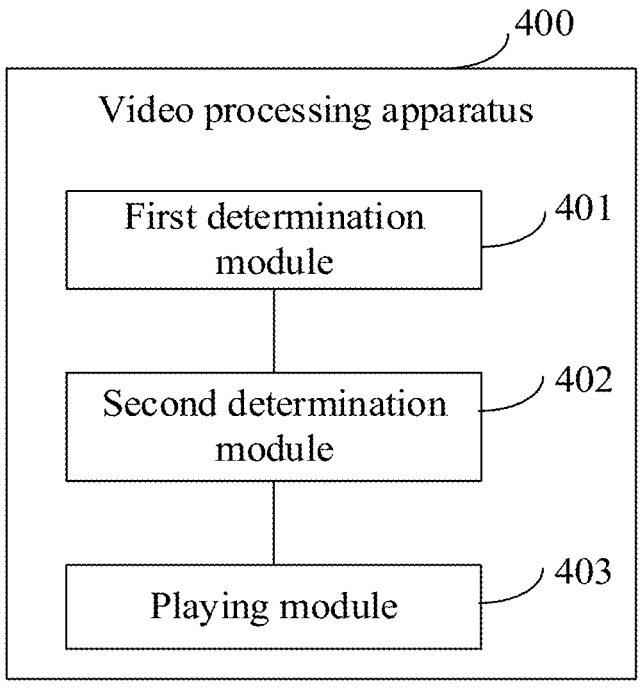
FIG. 4 is a structural schematic diagram of a video processing apparatus provided in an embodiment of the present disclosure.

Based on the same inventive concept as the above method embodiments, the present disclosure further provides a video processing apparatus 400. With reference to FIG. 4, which is a structural schematic diagram of a video processing apparatus provided in an embodiment of the present disclosure, the video processing apparatus 400 includes:

a first determination module 401, configured to determine whether a target video belongs to a preset video type, where the preset video type is a video type that indicates only supporting playing once for each user;

a second determination module 402, configured to determine whether a video state identifier of the target video belongs to a hasViewed identifier if the target video is determined to belong to the preset video type, where the video state identifier is used for characterizing whether the target video recorded in a server is in a hasViewed state for a current user; and a playing module 403, configured to play the target video if the video state identifier is determined not to belong to the hasViewed identifier.

In an alternative implementation, the apparatus further comprises:

an inquiring module, configured to inquire whether the target video belongs to the hasViewed state for the current user in a local history record.

Correspondingly, the playing module 403 comprises:

a playing sub-module, configured to play the target video if it is determined that, in the local history record, the target video does not belong to the hasViewed state for the current user.

In an alternative implementation, the apparatus further comprises:

a storage module, configured to store a record that the target video is in the hasViewed state for the current user in the local history record.

In an alternative implementation, the apparatus further comprises:

a first display module, configured to display a preset destroyed state of the target video if it is determined that, in the local history record, the target video belongs to the hasViewed state for the current user.

In an alternative implementation, the local history record comprises video playing history information carrying a video identifier and a user identifier, and the inquiring module comprises:

a determination sub-module, configured to determine whether video playing history information carrying a video identifier of the target video and a user identifier of the current user exists in the local history record.

Correspondingly, the playing sub-module is further configured to:

play the target video if it is determined that the video playing history information carrying the video identifier of the target video and the user identifier of the current user does not exist in the local history record.

In an alternative implementation, the apparatus further comprises:

a second display module, configured to display a preset destroyed state of the target video if the video state identifier is determined to belong to the hasViewed identifier.

In an alternative implementation, the apparatus further comprises:

a reporting module, configured to report video playing history information carrying a video identifier of the target video and a user identifier of the current user to the server, where the video playing history information is used for updating a playing state of the target video for the current user at the server.

In the video processing apparatus provided in the embodiments of the present disclosure, firstly, it is determined whether a target video belongs to a preset video type, and the preset video type is a video type that indicates only supporting playing once for each user; it is determined whether a video state identifier of the target video belongs to a hasViewed identifier if the target video is determined to belong to the preset video type, and the video state identifier is used for characterizing whether the target video recorded in a server is in a hasViewed state for a current user; and then the target video is played if the video state identifier is determined not to belong to the hasViewed identifier. The embodiments of the present disclosure ensure the playing effect for a flashing video by way of determining whether the target video has been played on a current terminal based on the hasViewed state of the target video recorded in the server for the current user, thereby enhancing the experience of the user watching the video.

In addition to the above method and apparatus, the embodiments of the present disclosure further provide a computer-readable storage medium, the computer-readable storage medium stores instructions, when the instructions are run on a terminal device, the terminal device is caused to implement the video processing method described in the embodiments of the present disclosure.

The embodiments of the present disclosure further provide a computer program product, the computer program product comprises a computer program/instruction, and when the computer program/instruction is executed by a processor, the video processing method described in the embodiments of the present disclosure is implemented.

Figure 5:
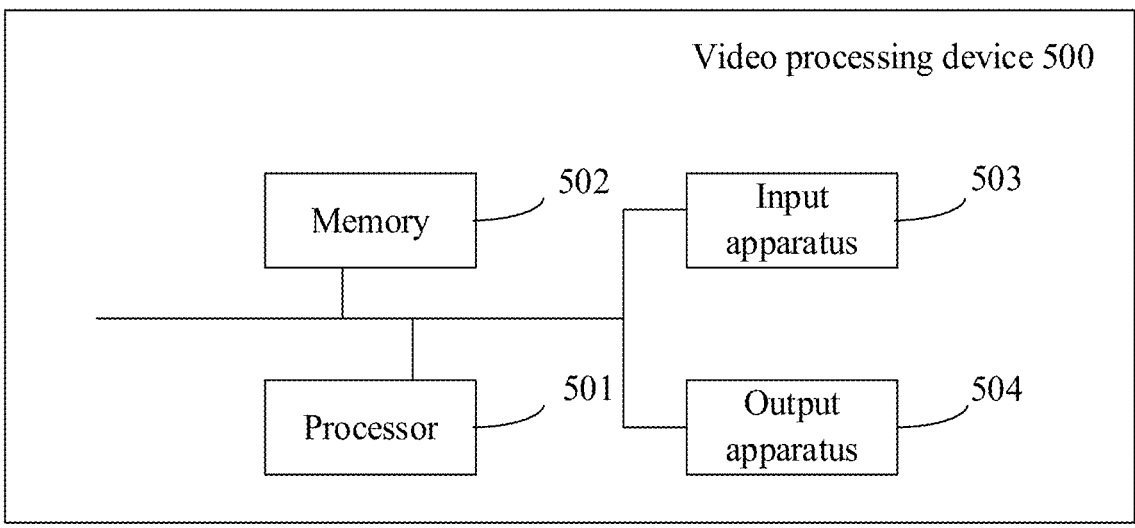
FIG. 5 is a structural schematic diagram of a video processing device provided in an embodiment of the present disclosure.

In addition, an embodiment of the present disclosure further provides a video processing device 500. As shown in FIG. 5, which is a structural schematic diagram of a video processing device provided in an embodiment of the present disclosure, the video processing device 500 may include:

a processor 501, a memory 502, an input apparatus 503, and an output apparatus 504. The number of processors 501 in the video processing device can be one or more, and one processor is taken as an example in FIG. 5. In some embodiments of the present disclosure, the processor 501, the memory 502, the input apparatus 503, and the output apparatus 504 may be connected through a bus or other means, and the connection through a bus is taken as an example in FIG. 5.

The memory 502 may be used to store software programs and modules, and the processor 501 executes various functional applications and data processing of the video processing device by running the software programs and modules stored in the memory 502. The memory 502 may mainly include a storage program area and a storage data area, the storage program area may store an operating system, an application program required by at least one function, and the like. In addition, the memory 502 may include a high-speed random-access memory, and may also include a non-volatile memory, such as at least one magnetic disk memory device, a flash memory device, or other volatile solid-state memory devices. The input apparatus 503 can be used to receive input numeric or character information and to generate signal input related to user settings and function control of the video processing device.

Specifically, in the embodiment, the processor 501 can load the executable files corresponding to the processes of one or more application programs into the memory 502 according to the following instructions, and the processor 501 can run the application programs stored in the memory 502, thus implementing various functions of the above video processing device.

It should be understood that in the specification, the relational terms such as "first", "second", etc. are only used for distinguishing one entity or operation from another entity or operation, and do not necessarily require or imply any such actual relationship or order between these entities or operations. Moreover, the term "comprise/include", "contain", and any variations thereof are intended to cover non-exclusive inclusion, such that a process, method, article, or device including a series of elements includes not only those elements, but also other elements not explicitly listed or elements inherent to such process, method, article, or device. Without further restrictions, an element defined by the phrase "comprising/including one" does not exclude the existence of other identical elements in the process, method, article, or device including the element.

What has been described above is only the specific implementation of the present disclosure, so that those skilled in the art can understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to the embodiments described herein, but is to be accorded the widest scope consistent with the principles and novel features disclosed herein.

The invention claimed is:

1. A video processing method, comprising:

determining whether a type of a target video is a preset video type based on a video type identifier, wherein the preset video type is a video type that indicates supporting playing once for each user, the video type identifier is used to uniquely identify the video type to which the target video belongs;

determining whether a video state identifier of the target video is a hasViewed identifier if the type of the target video is determined to be the preset video type, wherein the video state identifier is used for characterizing whether a playing state of the target video, recorded in a server, for a current user is a hasViewed state;

determining whether the playing state of the target video for the current user is the hasViewed state by inquiring in a local history record; and playing the target video in response to determining that the video state identifier is not the hasViewed identifier, and in the local history record, the playing state of the target video for the current user is not the hasViewed state.

2. The method according to claim 1, wherein after the playing the target video, the method further comprises:

storing a record that the target video is in the hasViewed state for the current user in the local history record.

3. The method according to claim 1, further comprising:

displaying a preset destroyed state of the target video in response to determining that, in the local history record, the playing state of the target video for the current user is the hasViewed state.

4. The method according to claim 1, wherein the local history record comprises video playing history information carrying a video identifier and a user identifier; the determining whether the playing state of the target video for the current user is the hasViewed state by inquiring in a local history record comprises:

determining whether video playing history information carrying a video identifier of the target video and a user identifier of the current user exists in the local history record; and the playing the target video in response to determining that the video state identifier is not the hasViewed identifier, and in the local history record, the playing state of the target video for the current user is not the hasViewed state, comprises:

playing the target video in response to determining that the video state identifier is not the hasViewed identifier, and the video playing history information carrying the video identifier of the target video and the user identifier of the current user does not exist in the local history record.

5. The method according to claim 1, further comprising:

displaying a preset destroyed state of the target video in response to determining that the video state identifier is the hasViewed identifier.

6. The method according to claim 1, wherein after the playing the target video, the method further comprises:

reporting video playing history information carrying a video identifier of the target video and a user identifier of the current user to the server, wherein the video playing history information is used for updating the playing state of the target video for the current user at the server.

7. A non-transitory computer-readable storage medium, wherein the computer-readable storage medium stores instructions, when the instructions are run on a terminal device, the terminal device is caused to implement a video processing method, wherein the video processing method comprises:

determining whether a type of a target video is a preset video type based on a video type identifier, wherein the preset video type is a video type that indicates supporting playing once for each user, the video type identifier is used to uniquely identify the video type to which the target video belongs;

determining whether a video state identifier of the target video is a hasViewed identifier if the type of the target video is determined to be the preset video type, wherein the video state identifier is used for characterizing whether a playing state of the target video, recorded in a server, for a current user is a hasViewed state;

determining whether the playing state of the target video for the current user is the hasViewed state by inquiring in a local history record; and playing the target video in response to determining that the video state identifier is not the hasViewed identifier, and in the local history record, the playing state of the target video for the current user is not the hasViewed state.

8. A device, comprising a memory, a processor, and a computer program stored on the memory and executable on the processor, wherein the processor is configured to, when executing the computer program, implement a video processing method, wherein the video processing method comprises:

determining whether a type of a target video is a preset video type based on a video type identifier, wherein the preset video type is a video type that indicates supporting playing once for each user, the video type identifier is used to uniquely identify the video type to which the target video belongs;

determining whether a video state identifier of the target video is a hasViewed identifier if the type of the target video is determined to be the preset video type, wherein the video state identifier is used for characterizing whether a playing state of the target video, recorded in a server, for a current user is a hasViewed state; and determining whether the playing state of the target video for the current user is the hasViewed state by inquiring in a local history record; and playing the target video in response to determining that the video state identifier is not the hasViewed identifier, and in the local history record, the playing state of the target video for the current user is not the hasViewed state.

9. The method according to claim 2, further comprising:

displaying a preset destroyed state of the target video if it is determined that, in the local history record, the playing state of the target video for the current user is the hasViewed state.

10. The method according to claim 2, wherein the local history record comprises video playing history information carrying a video identifier and a user identifier; the determining whether the playing state of the target video for the current user is the hasViewed state by inquiring in a local history record comprises:

determining whether video playing history information carrying a video identifier of the target video and a user identifier of the current user exists in the local history record; and the playing the target video in response to determining that the video state identifier is not the hasViewed identifier, and in the local history record, the playing state of the target video for the current user is not the hasViewed state, comprises:

playing the target video in response to determining that the video state identifier is not the hasViewed identifier, and the video playing history information carrying the video identifier of the target video and the user identifier of the current user does not exist in the local history record.

11. The method according to claim 3, wherein the local history record comprises video playing history information carrying a video identifier and a user identifier; the determining whether the playing state of the target video for the current user is the hasViewed state by inquiring in a local history record comprises:

determining whether video playing history information carrying a video identifier of the target video and a user identifier of the current user exists in the local history record; and the playing the target video in response to determining that the video state identifier is not the hasViewed identifier, and in the local history record, the playing state of the target video for the current user is not the hasViewed state, comprises:

playing the target video in response to determining that the video state identifier is not the hasViewed identifier, and the video playing history information carrying the video identifier of the target video and the user identifier of the current user does not exist in the local history record.

12. The method according to claim 2, further comprising:

displaying a preset destroyed state of the target video in response to determining that the video state identifier is the hasViewed identifier.

13. The method according to claim 2, wherein after the playing the target video, the method further comprises:

reporting video playing history information carrying a video identifier of the target video and a user identifier of the current user to the server, wherein the video playing history information is used for updating the playing state of the target video for the current user at the server.

14. The device according to claim 8, wherein after the playing the target video, the video processing method further comprises:

storing a record that the target video is in the hasViewed state for the current user in the local history record.

15. The device according to claim 8, wherein the video processing method further comprises:

displaying a preset destroyed state of the target video if it is determined that, in the local history record, the playing state of the target video for the current user is the hasViewed state.

16. The device according to claim 8, wherein the local history record comprises video playing history information carrying a video identifier and a user identifier;

the determining whether the playing state of the target video for the current user is the hasViewed state by inquiring in a local history record comprises:

determining whether video playing history information carrying a video identifier of the target video and a user identifier of the current user exists in the local history record; and the playing the target video in response to the video state identifier being determined not to be the hasViewed identifier and in the local history record, the playing state of the target video for the current user being not the hasViewed state, comprises:

playing the target video if it is determined that the video state identifier is not the hasViewed identifier, and the video playing history information carrying the video identifier of the target video and the user identifier of the current user does not exist in the local history record.

* * * * *